(12) United States Patent
Heinzman

(10) Patent No.: US 8,049,004 B2
(45) Date of Patent: *Nov. 1, 2011

(54) PROCESSES FOR MAKING ETHERSUCCINYLATED HYDROXYL POLYMERS

(75) Inventor: Stephen Wayne Heinzman, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,721

(22) Filed: Aug. 5, 2010

(65) Prior Publication Data

US 2010/0298497 A1    Nov. 25, 2010

Related U.S. Application Data

(63) Continuation of application No. 11/411,334, filed on Apr. 26, 2006, now Pat. No. 7,772,391.

(60) Provisional application No. 60/691,104, filed on Jun. 16, 2005.

(51) Int. Cl.
   C08B 1/00    (2006.01)
   C08B 31/00   (2006.01)
   C08B 37/08   (2006.01)
   C08F 8/00    (2006.01)

(52) U.S. Cl. ....... 536/123.1; 536/56; 536/102; 536/105; 536/114

(58) Field of Classification Search ............ 536/56, 536/102, 105, 114, 123.1
See application file for complete search history.

(56) References Cited

U.S. PATENT DOCUMENTS

| 2,316,128 A | 4/1943 | Bock et al. |
| 2,801,241 A | 7/1957 | Hobbs |
| 3,655,644 A | 4/1972 | Muscatine |
| 3,702,847 A | 11/1972 | Hathaway |
| 3,839,320 A | 10/1974 | Bauer |
| 4,017,460 A | 4/1977 | Tessler |
| 4,119,477 A | 10/1978 | Cohen et al. |
| 5,328,565 A | 7/1994 | Rasch et al. |
| 5,342,225 A | 8/1994 | Farr |
| 5,843,279 A | 12/1998 | Phan et al. |
| 6,670,470 B1 | 12/2003 | Ketola et al. |
| 2006/0287519 A1 | 12/2006 | Heinzman |

FOREIGN PATENT DOCUMENTS

| CN | 1230581 A | 10/1999 |
| CN | 1078211 C | 1/2002 |
| DE | 4123000 A1 | 1/1993 |
| EP | 0 031 477 A2 | 7/1981 |
| EP | 0 714 914 A1 | 6/1996 |
| EP | 1132427 A1 | 12/2001 |
| EP | 1035239 B1 | 5/2005 |
| EP | 1217107 B1 | 5/2005 |
| EP | 1217106 B1 | 11/2005 |
| WO | WO 02/38614 A1 | 5/2002 |
| WO | WO 03/066942 A1 | 8/2003 |
| WO | WO 03/097701 A1 | 11/2003 |

OTHER PUBLICATIONS

Fernandez, C.E. et al, Macromolecular Bioscience 2005, 5, 172-176.*
Yoncheva, K. et al Intl. J. Pharm. 2001, 226, 31-37.*
Fernandez, et al., "Low-Molecular_Weight Poly (χ-methyl β,L-malate) of Microbial Origin: Synthesis and Crystallizaiton", Macromolecular Bioscience, 5, pp. 172-176 (2005).
Geffroy, et al., "A: Physicochemical and Engineering Aspects", Colloids and Surfaces, vol. 162, pp. 107-121 (2000).
Othmer, Encyclopedia of Chemical Technology, 4th Edition, vol. 22, pp. 699-719.
Pourdeyhimi, et al., "Measuring Fiber Diameter Distribution in Nonwovens", Textile Res. J., 69(4), pp. 233-236 (1999).
Yoncheva, et al., "Development and characterization of cross-linked poly(malate) microspheres with dipyridamole", International Journal of Pharmaceutics, 226, pp. 31-37 (2001).

* cited by examiner

Primary Examiner — Shaojia Anna Jiang
Assistant Examiner — Ganapathy Krishnan
(74) Attorney, Agent, or Firm — C. Brant Cook

(57) ABSTRACT

Processes for making ethersuccinylated hydroxyl polymers are provided.

7 Claims, 1 Drawing Sheet

PROCESSES FOR MAKING ETHERSUCCINYLATED HYDROXYL POLYMERS

CROSS REFERENCE TO RELATED APPLICATIONS

This application is a continuation application of U.S. application Ser. No. 11/411,334 filed Apr. 26, 2006 now U.S. Pat. No. 7,772,391, which claims the benefit of U.S. Provisional Application No. 60/691,104 filed Jun. 16, 2005.

FIELD OF THE INVENTION

The present invention relates to ethersuccinylated hydroxyl polymers, processes for making ethersuccinylated hydroxyl polymers, and uses of ethersuccinylated hydroxyl polymers. Such uses include polymer solutions wherein the polymer solutions comprise an ethersuccinylated hydroxyl polymer; polymeric structures made from such polymer solutions; and processes/methods related thereto.

BACKGROUND OF THE INVENTION

Covalently attaching substituents to hydroxyl polymers, for example hydroxyethyl, hydroxypropyl, and methyl, is well known as a way to modify various properties of the hydroxyl polymer including solubility, viscosity, film formation, suspension of solids, and adhesiveness. Substituents which have carboxyl groups, for example carboxymethyl, can have additional properties including emulsion stabilization, binding of cationic species, crystal growth inhibition, and increasing the compatibility with other polymers. The carboxyl group can also be used to crosslink the hydroxyl polymer either by formation of ester links or by ionic crosslinks between carboxyl groups. Such crosslinked hydroxyl polymers can swell rapidly in water to form strong hydrogels. Substituents which are linked to the hydroxyl polymer via an ether linkage, for example carboxymethyl, hydroxyethyl, hydroxypropyl, and methyl are advantageous since the ether linkage is stable under both acidic and basic pH conditions. Ethersuccinate is a substituent which contains both carboxyl groups and an ether linkage to the hydroxyl polymer.

Synthesis of substituted hydroxyl polymers can be problematic. For example synthesis of carboxymethyl starch in the granular form requires either a high content of salt in the reaction mixture or the use of solvents in combination with water. The salt, solvents, and unreacted chloroacetate must be removed for many applications. In the case of hydroxyethyl starch, the reactor must have expensive safety controls due to the toxicity and flammability of the ethylene oxide reactant.

Accordingly, there is a need for substituted hydroxyl polymers which can be made with simple, inexpensive processes and which exhibit the various properties of substituted hydroxyl polymers, especially the property of being polymer processed in order to make various polymeric structures such as fibers, films, foams, and coatings.

SUMMARY OF THE INVENTION

The present invention fulfills the needs described above by providing an ethersuccinylated hydroxyl polymer, processes for making ethersuccinylated hydroxyl polymers, and products and uses of such ethersuccinylated hydroxyl polymers.

In one example of the present invention, a hydroxyl polymer comprising an ethersuccinate moiety having the formula:

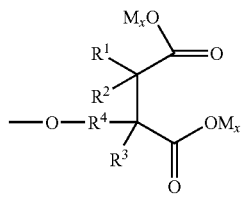

wherein $R^1$, $R^2$ and $R^3$ are independently selected from H, branched or linear $C_1$-$C_4$ alkyl and mixtures thereof; $R^4$ is a $(CH_2)_y$; M is independently selected from H, cations and mixtures thereof; x is greater than 0 but less than or equal to 1; y is 0 or 1, is provided.

In another example of the present invention, a polymer solution comprising: a) an ethersuccinylated hydroxyl polymer according to the present invention; and b) a crosslinking system capable of crosslinking the ethersuccinylated hydroxyl polymer, is provided.

In even another example of the present invention, a polymeric structure, such as a fiber, film, foam and/or coating, comprising an ethersuccinylated hydroxyl polymer according to the present invention, is provided.

In still another example of the present invention, a fibrous structure comprising a polymeric structure according to the present invention, is provided.

In yet another example of the present invention, a single- or multi-ply sanitary tissue product comprising a polymeric structure and/or fibrous structure according to the present invention, is provided.

In even still another example, a process for making an ethersuccinylated hydroxyl polymer wherein the process comprises the step of reacting a precursor hydroxyl polymer with an α, β-unsaturated dicarboxylic acid or salt thereof to produce the ethersuccinylated hydroxyl polymer, is provided.

In still yet another example of the present invention, a process for making a polymeric structure according to the present invention, wherein the process comprises the steps of:
  a. making a polymer solution comprising:
    i. an ethersuccinylated hydroxyl polymer according to the present invention; and
    ii. a crosslinking system capable of crosslinking the polymer; and
  b. polymer processing the polymer solution to produce a polymeric structure, is provided.

Accordingly, the present invention provides an ethersuccinylated hydroxyl polymer, a polymer solution comprising such ethersuccinylated hydroxyl polymer, a polymeric structure produced from such polymer solution and processes for making same.

DETAILED DESCRIPTION OF THE INVENTION

Definitions

Figure 1A:
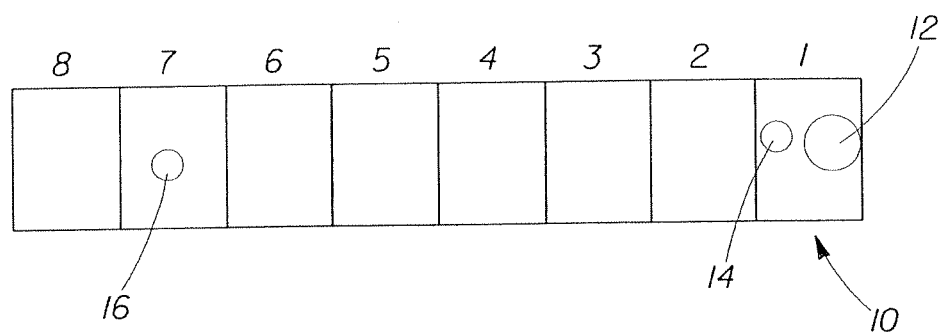
FIG. 1A is a schematic side view of a barrel of a twin screw extruder suitable for use in the present invention.

"Ethersuccinylated hydroxyl polymer" as used herein means a hydroxyl polymer that comprises at least one ethersuccinate moiety. The ethersuccinate moiety may be covalently bonded directly to a carbon atom within the backbone of the hydroxyl polymer.

"Polymer structure" as used herein means any single physical structure produced by an ethersuccinylated hydroxyl polymer or polymer solution comprising at least one ethersuccinylated hydroxyl polymer. The polymer structures are produced from an ethersuccinylated hydroxyl polymer or an ethersuccinylated-containing polymer solution that is polymer processed into the physical structure. The polymer structures may be dry spun and/or solvent spun. "Dry spinning", "dry spun" and/or "solvent spinning", "solvent spun" as used herein unlike wet spinning means that polymer structures are not spun into a coagulating bath.

The polymer structures of the present invention, especially fibers of the present invention, may be produced by crosslinking ethersuccinylated hydroxyl polymers together, alone or to other polymers. Nonlimiting examples of a suitable crosslinking system for achieving crosslinking comprises a crosslinking agent and optionally a crosslinking facilitator, wherein the ethersuccinylated hydroxyl polymer is crosslinked by the crosslinking agent.

A "fibrous structure" as used herein means a single web structure that comprises at least one fiber. For example, a fibrous structure of the present invention may comprise one or more fibers, wherein at least one of the fibers comprises an ethersuccinylated hydroxyl polymer structure in fiber form. In another example, a fibrous structure of the present invention may comprise a plurality of fibers, wherein at least one (sometimes a majority, even all) of the fibers comprises an ethersuccinylated hydroxyl polymer structure in fiber form. The fibrous structures of the present invention may be layered such that one layer of the fibrous structure may comprise a different composition of fibers and/or materials from another layer of the same fibrous structure.

The polymer structures in fiber, fibrous structure, film and/or foam form may be incorporated into sanitary tissue products and/or other paper-like products, such as writing papers, cores, such as tissue product cores, packaging films, and packaging peanuts.

One or more polymer structures of the present invention may be incorporated into a multi-polymer structure product.

"Sanitary tissue product" as used includes but is not limited to a wiping implement for post-urinary and post-bowel movement cleaning (toilet tissue), for otorhinolaryngological discharges (facial tissue), and multi-functional absorbent, cleaning uses (absorbent towels), wipes, feminine care products and diapers.

"Ply" or "Plies" as used herein means a single fibrous structure optionally to be disposed in a substantially contiguous, face-to-face relationship with other plies, forming a multi-ply sanitary tissue product. It is also contemplated that a single fibrous structure can effectively form two "plies" or multiple "plies", for example, by being folded on itself. Ply or plies can also exist as films or other polymer structures.

One or more layers may be present in a single ply. For example, two or more layers of different compositions may form a single ply. In other words, the two or more layers are substantially or completely incapable of being physically separated from each other without substantially damaging the ply.

"Fiber" as used herein means a slender, thin, and highly flexible object having a major axis which is very long, compared to the fiber's two mutually-orthogonal axes that are perpendicular to the major axis. In one example, an aspect ratio of the major's axis length to an equivalent diameter of the fiber's cross-section perpendicular to the major axis is greater than 100/1, more specifically greater than 500/1, and still more specifically greater than 1000/1, and even more specifically, greater than 5000/1.

The fibers of the present invention may be continuous or substantially continuous. A fiber is continuous if it extends 100% of the MD length of the fibrous structure and/or fibrous structure and/or sanitary tissue product made therefrom. In one embodiment, a fiber is substantially continuous if it extends greater than about 30% and/or greater than about 50% and/or greater than about 70% of the MD length of the fibrous structure and/or sanitary tissue product made therefrom.

The fiber can have a fiber diameter as determined by the Fiber Diameter Test Method described herein of less than about 50 microns and/or less than about 20 microns and/or less than about 10 microns and/or less than about 8 microns and/or less than about 6 microns.

The fibers may include melt spun fibers, dry spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Capillary Number" as used herein is a number representing the ratio of the viscous fluid forces to surface tension forces. Near the exit of a capillary die, if the viscous forces are not significantly larger than the surface tension forces, the fluid filament will break into droplets, which is commonly termed "atomization." The Capillary Number is calculated according to the following equation:

$$Ca = (\eta_s \cdot Q)/(\pi \cdot r^2 \cdot \sigma)$$

where $\eta_s$ is the shear viscosity in Pascal·seconds measured at a shear rate of 3000 s$^{-1}$; Q is the volumetric fluid flow rate through capillary die in m$^3$/s; r is the radius of the capillary die in meters (for non-circular orifices, the equivalent diameter/radius can be used); and σ is the surface tension of the fluid in Newtons per meter.

Ethersuccinylated Hydroxyl Polymers

"Hydroxyl polymer" as used herein includes any hydroxyl-containing polymer that can be incorporated into a polymer structure of the present invention, such as into a polymer structure in the form of a fiber. In one example, the hydroxyl polymers in accordance with the present invention are a) capable of being at least partially solubilized or swelled in water in order that they can undergo reaction with the butanedioic acid reactant and/or b) stable to the alkaline reaction condition.

In one example, the precursor hydroxyl polymer and/or ethersuccinylated hydroxyl polymer of the present invention includes greater than 10% and/or greater than 20% and/or greater than 25% by weight hydroxyl moieties.

Nonlimiting examples of hydroxyl polymers in accordance with the present invention include polyols, such as polyvinyl alcohol, polyvinyl alcohol derivatives, polyvinyl alcohol copolymers, starch, starch derivatives, chitosan, chitosan derivatives, cellulose, cellulose derivatives such as cellulose ether and ester derivatives, gums, arabinans, galactans, galactomannans, proteins and various other polysaccharides and mixtures thereof.

Classes of hydroxyl polymers are defined by the hydroxyl polymer backbone. For example polyvinyl alcohol and polyvinyl alcohol derivatives and polyvinyl alcohol copolymers are in the class of polyvinyl alcohol hydroxyl polymers whereas starch and starch derivatives are in the class of starch hydroxyl polymers.

The hydroxyl polymer may have a weight average molecular weight of from about 2,500 g/mol and/or from about 10,000 to about 40,000,000 g/mol. Higher and lower molecular weight hydroxyl polymers may be used in combination with hydroxyl polymers having the preferred weight average molecular weight.

Well known modifications of hydroxyl polymer, such as natural starches, include chemical modifications and/or enzymatic modifications. For example, the natural starch can be acid-thinned, hydroxy-ethylated, hydroxy-propylated, and/or oxidized. In addition, the hydroxyl polymer may comprise dent corn starch hydroxyl polymer.

Polyvinyl alcohols herein can be copolymerized with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters.

The ethersuccinate moiety may be substituted on any of the hydroxyl groups present in the hydroxyl polymer to result in the ethersuccinylated hydroxyl polymer. For example, the ethersuccinate moiety may be substituted on the most acidic and/or least sterically hindered hydroxyl groups. Preferential substitution may be occurring on the hydroxyl attached to the carbon adjacent to the glucoside carbon.

In one example, the percentage of hydroxyls substituted with ethersuccinate moieties may range from 0.1% to 99%.

In another example, the hydroxyl polymer may have other substituents, in addition to the ethersuccinate moiety.

In yet another example, the hydroxyl polymer may comprise a polysaccharide.

A. Starch Hydroxyl Polymers

Precursor natural starch and/or modified starch-based polymer and/or oligomer materials, modified amylose (represented by Structure I below) and/or modified amylopectin (represented by Structure II below) both of which are described in Kirk-Othmer's *Encyclopedia of Chemical Technology* 4$^{th}$ Edition, Vol. 22, pp. 701-703, starch, generally, is described at pp. 699-719, which are suitable for use as the hydroxyl polymers of the present invention can be characterized by the following general structures, alone or in combination:

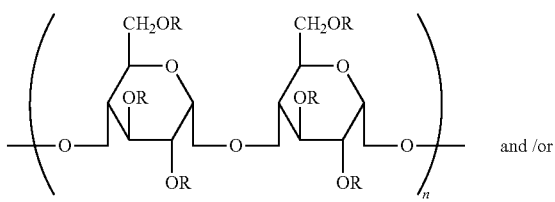

Structure I and /or

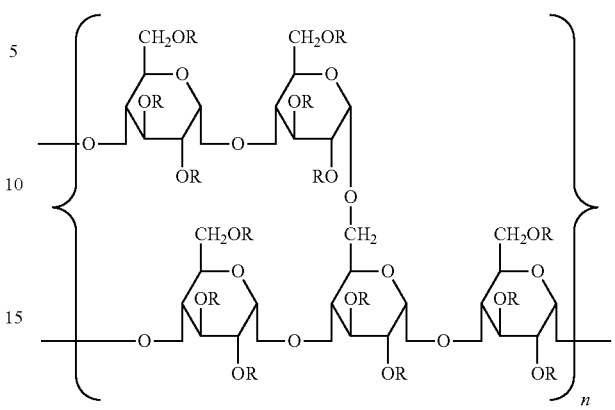

Structure II wherein each R is selected from the group consisting of $R_a$, $R_c$, and $R_p$;

wherein:

each $R_a$ is independently selected from the group consisting of H and $C_1$-$C_4$ alkyl;

each $R_c$ is

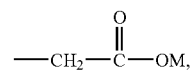

wherein M is a suitable cation selected from the group consisting of H$^+$, Na$^+$, K$^+$, 1/2Ca$^{2+}$, 1/2Mg$^{2+}$, barium, zinc and lanthanum (III), or $^+$NH$_j$R$_k$ wherein j and k are independently from 0 to 4 and wherein j+k is 4 and R in this formula is any moiety capable of forming a cation, such as methyl and/or ethyl group or derivative;

each $R_p$ is

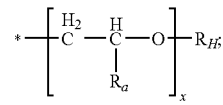

each $R_H$ is independently selected from the group consisting of $R_a$ and $R_c$ each x is from 1 to about 5;

n is a number that results in the polymer having a weight average molecular weight in accordance with the present invention.

In one example, the precursor starch hydroxyl polymer unsubstituted and thus R equals H in Structures I and II. After the ethersuccinylation reaction is carried out on the precursor starch hydroxyl polymer, R is selected from the group consisting of $R_a$, $R_c$, $R_p$, and $R_E$;

wherein:
each $R_E$ is

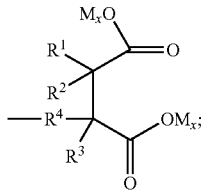

and
each $R_H$ is independently selected from the group consisting of $R_a$, $R_c$, and $R_E$.

The "Degree of Substitution" ("DS") for group $R_E$, which is sometimes abbreviated herein "$DS_E$", means the number of moles of group $R_E$ components that are substituted per anhydrous glucose unit, wherein an anhydrous glucose unit is a six membered ring as shown in the repeating unit of the general structure above.

The "Degree of Substitution" for group $R_c$, which is sometimes abbreviated herein "$DS_c$", means the number of moles of group $R_c$ components that are substituted per anhydrous D-glucose unit, wherein an anhydrous D-glucose unit is a six membered ring as shown in the repeating unit of the general structures above.

A natural starch can be modified chemically or enzymatically, as well known in the art. For example, the natural starch can be acid-thinned, hydroxy-ethylated or hydroxy-propylated or oxidized. Though all starches are potentially useful herein, the present invention can be beneficially practiced with high amylose natural starches (starches that contain greater than 25% and/or greater than 50% and/or greater than 65% and/or greater than 70% and/or about 85% amylose) derived from agricultural sources, which offer the advantages of providing polymeric structures with superior material properties as compared to starches containing lower amounts of amylose. In order to form melt compositions of high amylose starches to make polymeric structures, it is usually necessary to substitute the starch and ethersuccinate is an effective substitution to enable melt compositions.

Chemical modifications of starch typically include acid or alkali hydrolysis and oxidative chain scission to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof. It is particularly advantageous to use the butanedioic acid reactant in combination with hydrogen peroxide and metal catalyst to reduce the starch molecular weight which can then be made into ethersuccinylated starch hydroxyl polymer by adding the cation catalyst and alkalinity. In one example, the molecular weight of the ethersuccinylated starch hydroxyl polymer may be reduced by adding peroxide into the reaction mixture and increasing the temperature at which the reaction mixture is subjected.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, acetyl, or carbamate starches or mixtures thereof can be used as chemically modified starches. The degree of substitution of the chemically modified starch is from 0.05 to 3.0, and more specifically from 0.05 to 0.2. If the derivatives are sensitive to alkaline conditions, for example esters, then such derivatization must be carried out after the ethersuccinylation reaction. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In order to generate the required rheological properties for high-speed spinning processes, the molecular weight of the natural, unmodified starch should be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a relatively high weight average molecular weight, for example in the range of 500,000 g/mol to 5,000,000 g/mol. Modified starches such as ethersuccinylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available ethersuccinylated Dent corn starch with $DS_E$=0.026 is from about 200,000 g/mol to about 3,000,000 g/mol. For ethersuccinylated starch hydroxyl polymers with higher degrees of ethersuccinylation, for example a ethersuccinylated Dent corn starch with $DS_E$=0.083, weight average molecular weights of up to 40,000,000 g/mol may be suitable for the present invention.

The weight average molecular weight of starch can be reduced to the desirable range for the present invention by chain scission (oxidative or enzymatic), hydrolysis (acid or alkaline catalyzed), physical/mechanical degradation (e.g., via the thermomechanical energy input of the processing equipment), or combinations thereof. The thermo-mechanical method and the oxidation method offer an additional advantage in that they are capable of being carried out in situ during the polymer processing operation.

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, butanedioic acid, and any combination thereof. Alternatively, a chain scission agent may be reacted with a starch slurry in the presence of a metal catalyst. Especially useful is the copper-catalyzed hydrogen peroxide scissions of starch as outlined in U.S. Pat.

No. 3,655,644, U.S. Pat. No. 6,670,470 and WO03/097701 because the scission occurs under alkaline conditions as does the ethersuccinylation reaction and because the molecular weight can be controlled by the amount of hydrogen peroxide added. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

B. Cellulose Hydroxyl Polymers

Cellulose and modified cellulose-based polymer and/or oligomer materials, (represented by Structure III below which are suitable for use as the hydroxyl polymers of the present invention can be characterized by the following general structures, alone or in combination:

Structure III

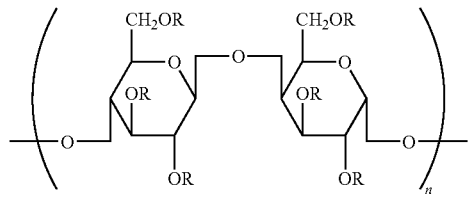

wherein each R is selected from the group consisting of $R_a$, $R_c$, and $R_p$, wherein:

each $R_a$ is independently selected from the group consisting of H and $C_1$-$C_4$ alkyl;

each $R_c$ is

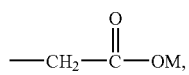

wherein M is a suitable cation selected from the group consisting of $H^+$, $Na^+$, $K^+$, $1/2Ca^{2+}$, $1/2Mg^{2+}$, barium, zinc and lanthanum (III), or $^+NH_jR_k$ wherein j and k are independently from 0 to 4 and wherein j+k is 4 and R in this formula is any moiety capable of forming a cation, such as methyl and/or ethyl group or derivative;

each $R_p$ is

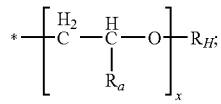

each $R_H$ is independently selected from the group consisting of $R_a$ and $R_c$ each x is from 1 to about 5;

n is a number that results in the polymer having a weight average molecular weight in accordance with the present invention.

In one example, the precursor cellulose hydroxyl polymer is unsubstituted and thus R equals H in Structure III. After the ethersuccinylation reaction is carried out R is selected from the group consisting of $R_a$, $R_c$, $R_p$, and $R_E$;

wherein:

each ethersuccinate $R_E$ is

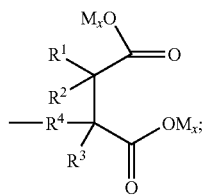

and each $R_H$ is independently selected from the group consisting of $R_a$, $R_c$, and $R_E$.

The "Degree of Substitution" for group $R_E$, which is sometimes abbreviated herein "$DS_E$", means the number of moles of group $R_E$ components that are substituted per anhydrous glucose unit, wherein an anhydrous glucose unit is a six membered ring as shown in the repeating unit of the general structure above.

The "Degree of Substitution" for group $R_C$, which is sometimes abbreviated herein "$DS_C$", means the number of moles of group $R_C$ components, that are substituted per anhydrous D-glucose unit, wherein an anhydrous D-glucose unit is a six membered ring as shown in the repeating unit of the general structures above.

C. Other Polysaccharide Hydroxyl Polymers

"Polysaccharides" herein means natural polysaccharides and polysaccharide derivatives or modified polysaccharides. Suitable other polysaccharides include, but are not limited to, chitosan, chitosan derivatives, gums, arabinans, galactans and mixtures thereof.

The polysaccharides can be extracted from plants, produced by organisms, such as bacteria, fungi, prokaryotes, eukaryotes, extracted from animals and/or humans. For example, xanthan gum can be produced by *Xanthomonas campestris*, gellan by *Sphingomonas paucimobilis*, xyloglucan can be extracted from tamarind seed.

The polysaccharides can be linear, or branched in a variety of ways, such as 1-2, 1-3, 1-4, 1-6, 2-3 and mixtures thereof.

It is desirable that the polysaccharides of the present invention have a weight average molecular weight in the range of from about 2,000 to about 10,000,000, more and/or from about 500,000 to about 5,000,000, and/or from about 1,000,000 to about 5,000,000 g/mol.

In one example, the polysaccharide is selected from the group consisting of: tamarind gum (containing xyloglucan polymers), guar gum, chitosan, chitosan derivatives, locust bean gum (containing galactomannan polymers), and other industrial gums and polymers, which include, but are not limited to, Tara, Fenugreek, Aloe, Chia, Flaxseed, Psyllium seed, quince seed, xanthan, gellan, welan, rhamsan, dextran, curdlan, pullulan, scleroglucan, schizophyllan, chitin, hydroxyalkyl cellulose, arabinan (such as from sugar beets), de-branched arabinan (such as from sugar beets), arabinoxylan (such as from rye and wheat flour), galactan (such as from lupin and potatoes), pectic galactan (such as from potatoes), galactomannan (such as from carob, and including both low and high viscosities), glucomannan, lichenan (such as from icelandic moss), mannan (such as from ivory nuts), pachyman, rhanmogalacturonan, acacia gum, agar, alginates, carrageenan, chitosan, clavan, hyaluronic acid, heparin, inulin, cellodextrins, and mixtures thereof. These polysaccharides can also be treated (such as enzymatically) so that the best fractions of the polysaccharides are isolated.

The natural polysaccharides can be modified with amines (primary, secondary, tertiary), amides, esters, ethers, alcohols, carboxylic acids, tosylates, sulfonates, sulfates, nitrates, phosphates and mixtures thereof. Such a modification can take place in position 2, 3 and/or 6 of the glucose unit. If the derivatives are sensitive to alkaline conditions, for example esters, then such derivatization must be carried out after the ethersuccinylation reaction. Such modified or derivatized polysaccharides can be included in the compositions of the present invention in addition to the natural polysaccharides.

Nonlimiting examples of such modified polysaccharides include: carboxyl and hydroxymethyl substitutions (e.g., glucuronic acid instead of glucose); amino polysaccharides (amine substitution, e.g., glucosamine instead of glucose); $C_1$-$C_6$ alkylated polysaccharides; acetylated polysaccharide ethers; polysaccharides having amino acid residues attached (small fragments of glycoprotein); polysaccharides containing silicone moieties. Suitable examples of such modified polysaccharides are commercially available from Carbomer and include, but are not limited to, amino alginates, such as hexanediamine alginate, amine functionalized cellulose-like O-methyl-(N-1,12-dodecanediamine) cellulose, biotin heparin, carboxymethylated dextran, guar polycarboxylic acid, carboxymethylated locust bean gum, carboxymethylated xanthan, chitosan phosphate, chitosan phosphate sulfate, diethylaminoethyl dextran, dodecylamide alginate, and mixtures thereof.

The polysaccharide polymers can be linear, like in hydroxyalkylcellulose, the polymer can have an alternating repeat like in carrageenan, the polymer can have an interrupted repeat like in pectin, the polymer can be a block copolymer like in alginate, the polymer can be branched like in dextran, the polymer can have a complex repeat like in xanthan. Descriptions of the polymer definitions are give in "An introduction to Polysaccharide Biotechnology", by M. Tombs and S. E. Harding, T. J. Press 1998.

D. Polyvinylalcohol Hydroxyl Polymers

Polyvinylalcohols which are suitable for use as the hydroxyl polymers (alone or in combination) of the present invention can be characterized by the following general formula:

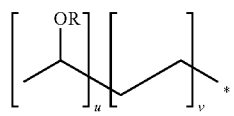

Structure IVa

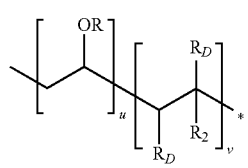

Structure IVb wherein each R is selected from the group consisting of $R_a$, $R_c$, and $R_p$;

wherein:
each $R_a$ is independently selected from the group consisting of H and $C_1$-$C_4$ alkyl;
each $R_c$ is

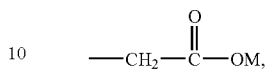

wherein M is a suitable cation selected from the group consisting of $H^+$, $Na^+$, $K^+$, $1/2Ca^{2+}$, $1/2Mg^{2+}$, barium, zinc and lanthanum (III), or $^+NH_jR_k$ wherein j and k are independently from 0 to 4 and wherein j+k is 4 and R in this formula is any moiety capable of forming a cation, such as methyl and/or ethyl group or derivative;
each $R_p$ is

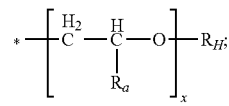

each $R_H$ is independently selected from the group consisting of $R_a$ and $R_c$
each x is from 1 to about 5;
each $R_D$ is independently selected from H, $R_C$ or $CO_2M$;
n is a number that results in the polymer having a weight average molecular weight in accordance with the present invention.

In one example, the precursor polyvinyl alcohol hydroxyl polymer is unsubstituted and thus R equals H in Structures IVa and IVb. After the ethersuccinylation reaction is carried out R is selected from the group consisting of $R_a$, $R_c$, $R_p$, and $R_E$;
wherein:
each ethersuccinate $R_E$ is

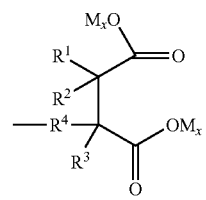

each $R_H$ is independently selected from the group consisting of $R_a$, $R_c$, and $R_E$.

The "Degree of Substitution" for group $R_E$, which is sometimes abbreviated herein "$DS_E$", means the number of moles of group $R_E$ components that are substituted per total vinylalcohol units, wherein the vinylalcohol unit is a the u unit as shown in the repeating unit of the general structure above.

Polymer Solution

The polymer solution may have a temperature of from about 50° C. to about 100° C. and/or from about 65° C. to about 95° C. and/or from about 70° C. to about 90° C. when making fibers from the polymer solution. The polymer solution temperature is generally higher when making film and/or foam polymer structures, as described below.

The pH of the polymer solution may be from about 2.5 to about 9 and/or from about 3 to about 8.5 and/or from about 3.2 to about 8 and/or from about 3.2 to about 7.5.

The polymer solution may exhibit a Capillary Number of at least 1 and/or at least 3 and/or at least 5 such that the polymer solution can be effectively polymer processed into a polymer structure, such as a fiber. In one example, the polymer solution exhibits a Capillary Number of from at least 1 to about 50 and/or at least 3 to about 50 and/or at least 5 to about 30. Further, the polymer solution may exhibit a pH of from at least about 4 to about 12 and/or from at least about 4.5 to about 11.5 and/or from at least about 4.5 to about 11.

A crosslinking system may be present in the polymer solution and/or may be added to the polymer solution before polymer processing of the polymer solution. Further, a crosslinking system may be added to the polymer structure after polymer processing the polymer solution.

The crosslinking system of the present invention may further comprise, in addition to the crosslinking agent, a crosslinking facilitator.

"Crosslinking agent" as used herein means any material that is capable of crosslinking a hydroxyl polymer within a polymer solution according to the present.

Nonlimiting examples of suitable crosslinking agents include polycarboxylic acids, imidazolidinones and other compounds resulting from alkyl substituted or unsubstituted cyclic adducts of glyoxal with ureas, thioureas, guanidines, methylene diamides, and methylene dicarbamates and derivatives thereof; and mixtures thereof.

"Crosslinking facilitator" as used herein means any material that is capable of activating a crosslinking agent thereby transforming the crosslinking agent from its unactivated state to its activated state.

Upon crosslinking the hydroxyl polymer, the crosslinking agent becomes an integral part of the polymer structure as a result of crosslinking the hydroxyl polymer as shown in the following schematic representation:

Hydroxyl polymer—Crosslinking agent—Hydroxyl polymer

The crosslinking facilitator may include derivatives of the material that may exist after the transformation/activation of the crosslinking agent. For example, a crosslinking facilitator salt being chemically changed to its acid form and vice versa.

Nonlimiting examples of suitable crosslinking facilitators include acids having a pKa of between 2 and 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Nonlimiting examples of suitable crosslinking facilitators include acetic acid, benzoic acid, citric acid, formic acid, glycolic acid, lactic acid, maleic acid, phthalic acid, phosphoric acid, succinic acid and mixtures thereof and/or their salts, such as their ammonium salts, such as ammonium glycolate, ammonium citrate, ammonium chloride and ammonium sulfate.

Additional nonlimiting examples of suitable crosslinking facilitators include glyoxal bisulfite salts, primary amine salts, such as hydroxyethyl ammonium salts, hydroxypropyl ammonium salt, secondary amine salts, ammonium toluene sulfonate, ammonium benzene sulfonate and ammonium xylene sulfonate.

In another embodiment, the crosslinking system of the present invention may be applied to a pre-existing form as a coating and/or surface treatment.

The polymer solution may comprise a) from about 5% and/or 10% and/or 20% and/or 30% and/or 40% and/or 45% and/or 50% to about 75% and/or 80% and/or 85% and/or 90% and/or 99.5% by weight of the polymer solution of one or more ethersuccinylated hydroxyl polymers; b) a crosslinking system comprising from about 0.1% to about 10% by weight of the polymer solution of a crosslinking agent; and c) from about 0% and/or 10% and/or 15% and/or 20% to about 50% and/or 55% and/or 60% and/or 70% by weight of the polymer solution of an external plasticizer e.g., water.

In one example, the polymer solution may comprise two or more different classes of hydroxyl polymers at weight ratios of from about 20:1 and/or from about 15:1 and/or from about 10:1 and/or from about 5:1 and/or from about 2:1 and/or from about 1:1 to about 1:20 and/or to about 1:15 and/or to about 1:10 and/or to about 1:5 and/or to about 1:2 and/or to about 1:1.

In another example, the polymer solution comprises from about 0.01% to about 20% and/or from about 0.1% to about 15% and/or from about 1% to about 12% and/or from about 2% to about 10% by weight of a first class of hydroxyl polymer, such as a polyvinyl alcohol hydroxyl polymer and from about 20% to about 99.99% and/or from about 25% to about 95% and/or from about 30% to about 90% and/or from about 40% to about 70% by weight of a second class of hydroxyl polymer, such as an ethersuccinylated starch hydroxyl polymer.

Nonlimiting Process for Making Ethersuccinylated Hydroxyl Polymer

A nonlimiting process for making ethersuccinylated hydroxyl polymers of the present invention is set forth below. Even though the following nonlimiting example utilizes starch hydroxyl polymer, those of ordinary skill in the art appreciate that other hydroxyl polymers can be ethersuccinylated in the same or similar manner.

In one example, such a process is a high yield process when starch is the precursor hydroxyl polymer. Yields of 70% or greater in one step are the norm when starch is the hydroxyl polymer. (Yields herein are based on the mol percentage of an $\alpha, \beta$-unsaturated dicarboxylic acid or salts, such as maleic acid (a butenedioic acid), feedstock that are converted to ethersuccinate substituents.) The making process can include recycles which can increase the yields further. Maximizing the yield is not the only consideration herein. The invention also provides selections of reaction conditions and compositions which provides the ethersuccinylated starch hydroxyl polymer as an aqueous melt or an easily handled granular solid. A further aspect of the process is that it provides the ethersuccinylated hydroxyl polymer with the carboxyl groups in the acid form or coordinated to a cation or present with solid calcium carbonate. A further aspect of the process is that native starch can have its molecular weight reduced with $\alpha, \beta$-unsaturated dicarboxylic acid or salts, hydrogen peroxide, and metal catalyst and then without isolation be submitted to the ethersuccinylation reaction. Alternatively, the ethersuccinylated hydroxyl polymer can have its molecular weight reduced with hydrogen peroxide under alkaline conditions.

In one example of a process for making an ethersuccinylated polymer in accordance with the present invention, the components of the reaction composition are comprise a precursor hydroxyl polymer, an $\alpha, \beta$-unsaturated dicarboxylic acid or salts, a cation catalyst and excess base.

A. Reactor Design and Operating Pressures

The ethersuccinylation process of the invention has no pressure criticality. However, since some hydroxyl polymers, for example polyvinylalcohol, are more difficult to deprotonate than starch, it can be advantageous to heat the reaction mixture at temperatures above reflux. A sealed reaction vessel of conventional construction, such as 316 SS (stainless steel)

is suitable. This reaction vessel need not be of titanium, nor need it be capable of withstanding high pressures, since the process is not corrosive and operates at low pressures of about 30 psi. As the aqueous polymer melt composition can be viscous, a scraped wall reactor is preferred. Alternatively, a screw extruder can be used which is described below. When the ethersuccinylation reaction is performed on hydroxyl polymers which form very viscous aqueous melts, for example guar, it is preferable that the reaction not be carried out in a melt state but instead as a damp flour mixture in a double Z-blade jacketed reactor. When the ethersuccinylation reaction is carried out on starch granules, a simple, stirred reaction tank can be used which can optionally be blanketed with nitrogen to prevent the calcium hydroxide reacting with carbon dioxide in the air.

B. Reaction Temperatures and Times

Reaction temperatures for ethersuccinylation depend on whether the hydroxyl polymer is an aqueous polymer melt, damp flour or a granule. In the first case, the melt temperatures are above 80° C. and/or are in the range of about 105 to about 150° C. In the second and third case, the temperatures are from about 40 to about 60° C. and/or from about 50 to about 55° C. Under such temperatures, the granules tend to not gelatinize.

Reaction time for reactions carried out in batches is generally measured as of completion of loading of all the components of the ethersuccinate reaction into the reactor and bringing the mixture as rapidly as possible to the reaction temperature. Batch reaction times are from about 2-24 hr. Reaction time for reactions carried out in extruders or static mixers is generally measured as the residence time in the reactor and this varies from about 2 to about 10 min. Naturally, it will be appreciated that shorter reaction times may be accompanied by selection of higher reaction temperatures within the indicated ranges.

C. Components of the Ethersuccinylation Reaction Mixture

The components herein are the hydroxyl polymer (as described above), an α,β-unsaturated dicarboxylic acid or salts, a cation catalyst, excess base, and water. The α, β-unsaturated dicarboxylic acid or salts may be in organic acid form and both the cation catalyst and excess base can conveniently be provided simultaneously, for example as calcium hydroxide. Alternatively, it is possible to adjust the amounts of each of the components independently.

In general, the molar ratio of the α, β-unsaturated dicarboxylic acid or salts component to the hydroxyl polymer depends on the properties desired from the ethersuccinylated hydroxyl polymer. For example, if viscosity modification can be achieved with a low $DS_E$ of 0.03, then the ratio of α, β-unsaturated dicarboxylic acid or salts component to hydroxyl polymer to form that particular $DS_E$ would need to be somewhat higher than 0.03 depending on the yield. If the property of cation binding requires a higher $DS_E$, for example 0.6, then the ratio of α, β-unsaturated dicarboxylic acid or salts component to hydroxyl polymer would need to be between 0.66 and 1.2.

In general, the molar ratio of the cation catalyst to the α, β-unsaturated dicarboxylic acid or salts component is at least 0.5 and/or greater than 1.0 and/or greater than 2.0 and/or between about 2.0 to about 2.4.

In general, the molar ratio of excess base to the α, β-unsaturated dicarboxylic acid or salts component is at least 0.7 and/or greater than 1.0 and/or greater than 1.5 and/or between about 1.5 to about 2.7.

In general, water is from about 30 to about 90 wt. % and/or from about 55 to about 65 wt % of the reaction mixture.

D. Chemical and Physical Forms of the Reaction Components

The suitable hydroxyl polymers are described in the "Constitution of Hydroxyl Polymers". The list of useful α, β-unsaturated dicarboxylic acid or salts reactants includes maleic anhydride (preferred), maleic acid, citraconic anhydride, citraconic acid, itaconic anhydride, and itaconic acid. The list of cation catalysts include calcium (preferred), magnesium, barium, zinc and lanthanum (III). In general, the chemical form of the cation catalysts will be that of oxide or hydroxide such as calcium oxide, calcium hydroxide, magnesium oxide, magnesium hydroxide or the like, or inert anion salts. The cation catalyst may be present in the butanedioic acid reactant, for example, in the production of itaconic and citraconic acid via fermentation each material is isolated from the broth as a calcium salt and that salt could be used directly in the ethersuccinylation process. For purposes of neutralizing the α, β-unsaturated dicarboxylic acid or salts reactant, salts such as calcium carbonate may be used. The excess base may be provided by the cation catalyst or by alkali hydroxides such as sodium hydroxide or potassium hydroxide. Inert anions, for example sulfate, can optionally be present herein. In one example, inert anions are not used in the processes of the invention. Process aids for example surfactants and hydrotropes can optionally be used in the processes of the invention.

E. Recycling of Reaction Components

Ethersuccinylation of starch in the granular state provides an opportunity to recycle the α, β-unsaturated dicarboxylic acid or salts component and the cation catalyst. Since calcium maleate is soluble up to 3.21 g per 100 mL of water at 40 C, the granules can be separated by centrifugation or filtration. The calcium maleate remains in the supernatant which can be used in a subsequent reaction. The amount of α, β-unsaturated dicarboxylic acid or salts reactant which is converted to ethersuccinate substitutent in the reaction could be added to the reaction mixture, thus forming calcium maleate allowing further recycling of calcium. Alternatively, the reaction mixture can be acidified with hydrochloric or acetic acid and the granules separated by centrifugation or filtration. Maleic acid and either calcium chloride or calcium acetate remain in the supernatant which can be used in a subsequent reaction. The ethersuccinylated hydroxyl polymer is also converted to the acid form in this way.

In one example the ratio of the mmoles of excess cation catalyst, such as calcium hydroxide, (as determined by subtracting the mmoles of α, β-unsaturated dicarboxylic acid or salts from the mmoles of the cation catalyst), per gram of hydroxyl polymer, such as starch hydroxyl polymer, is 0.3 mmol/g or greater. (If the cation catalyst only has one hydroxide moiety associated with it, then the ratio values will be doubled.) In another example, the ratio of the mmoles of excess cation catalyst, such as calcium hydroxide, (as determined by subtracting the mmoles of α, β-unsaturated dicarboxylic acid or salts from the mmoles of the cation catalyst), per gram of hydroxyl polymer, such as starch hydroxyl polymer, is from about 0.3 to about 0.7 mmol/g. In another example, the ratio of the moles of cation catalyst, such as calcium hydroxide, to the moles of α, β-unsaturated dicarboxylic acid or salts is greater than about 1.50. Under these examples, the need for additional acid over and above the α, β-unsaturated dicarboxylic acid or salts for this recycling operation to occur is limited or nonexistent.

F. Conversion of the Cation Catalyst to the Carbonate Form

In some applications it is desirable to minimize the salt content of the ethersuccinylated hydroxyl polymer. This can achieved by washing the granular product with acid as mentioned above or by converting the cation catalyst to an insoluble form, for example, carbonate. Carbon dioxide can be bubbled through the reaction mixture or alternatively sodium, potassium or ammonium carbonate can be added to the reaction mixture. For some applications the carbonate particles should be less than 1 micron, for example in a thermoplastic melt for use in spinning fibers. Bubbling carbon dioxide through the reaction in the presence of crystal growth inhibitors like polyacrylates or aminophosphonates can provide such small particles. After passing carbon dioxide through the mixture, the pH can be adjusted to greater than 8 to about 14 and/or greater than 8 to about 12 and/or greater than 8 to about 10 and/or from about 8.5 to about 9.5 to facilitate polymer solution formation.

In other applications it is desirable to remove the calcium ion altogether from the ethersuccinylated hydroxyl polymer. In the case of ethersuccinylated starch in the granular form, this can be achieved by adding a source of carbonate ion such as sodium carbonate and keeping the pH preferably between 10 and 10.5. The calcium carbonate formed under these conditions has a larger particle size and can be more easily separated from granular ethersuccinylated starch with a hydrocyclone.

NONLIMITING SYNTHESIS EXAMPLES

Example 1

Synthesis of Acid-Thinned Granular Starch Ethersuccinate

Eclipse G starch (acid thinned corn starch from AE Staley) (280.00 g, 1.73 mol) is placed in a 1000 mL bottle with lid along with 400 mL water. Then calcium hydroxide (32.00 g, 0.43 mol) and maleic acid (21.00 g, 0.18 mol) are added. The bottle is capped and placed in an 55° C. oven for 7 hr. The reaction mixture is then filtered and the precipitate is dried at 55° C. for 16 hr to give the product as white solid (310.55 g). When observed under cross polars with a microscope, the solid consists of birefringent starch granules. The acid content is determined to be 0.81 mmol H/g, the degree of substitution is 0.069, and the yield is 75% via Test Method A described herein.

Example 2

Synthesis of High Amylose Granular Starch Ethersuccinate

Hylon VII starch (high amylose corn starch from National Starch) (14.00 g, 0.086 mol) is placed in a 100 mL bottle with lid along with 20 mL water. Then calcium hydroxide (0.38 g, 5.13 mmol) and maleic acid (0.25 g, 2.15 mmol) are added. The bottle is capped and placed in an 55° C. oven for 16 hr. The reaction mixture is then filtered, washed with water (3×20 mL), washed with methanol (1×40 mL), and the precipitate is dried at 55° C. for 4 hr to give the product as white solid (12.47 g). When observed under cross polars with a microscope, the solid consists of birefringent starch granules. The acid content is determined to be 0.27 mmol H/g, the degree of substitution is 0.022, and the yield is 88% via Test Method A described herein.

Example 3

Synthesis of Acid-Thinned Destructured Starch Ethersuccinate

Eclipse G starch (105.00 g, 0.65 mol) is placed in a 1000 mL stainless steel beaker along with 400 mL water. Then calcium hydroxide (15.00 g, 0.20 mol) is added. The reaction mixture is placed in a hot water bath held at 70° C. and stirred with a Jiffy mixer. Then maleic acid (7.87 g, 0.068 mol) is added. The reaction mixture formed a light yellow gel and during the course of the reaction additional water is added to keep the gel fluid. After 3 hr of heating the reaction is terminated and the mixture weighed 706.41 g. A 46.00 gram portion of the reaction mixture is converted to 4.78 g of the acid form. The acid content is determined to be 0.74 mmol H/g, the degree of substitution is 0.063, and the yield is 62% via Test Method A described herein.

Example 4

Synthesis Via Extruder of Acid-Thinned Destructured Starch Ethersuccinate

Water (10000 g) is added to a Ekato/Unimix conical, 35 L, scraped wall, jacketed mixing tank with pressure capability. Then Eclipse G starch (6000 g) and calcium hydroxide (1984 g) is dispersed in 2000 g water to form a calcium hydroxide/starch mixture. The mixture is stirred and heated at 110° C. for 3 hr. The majority of the starch granules are birefringent.

The calcium hydroxide/starch mixture is added via a Zenith B9000 gear pump (4.5 cc/revolution) to port 2 of an APV 40:1 50 mm corotating twin screw extruder as described herein below. A 34.2% maleic acid solution is added to port 3 via PREP 100 HPLC pump (Chrom Tech, Apple Valley Minn.). Ammonium chloride (25% w/w) is added to the static mixer to bring the pH between 8 and 9.5. Water is also added to the static mixer to adjust the melt viscosity. The reactants are added with the following feed rates:

| Starch (g/min) | Ca(OH)$_2$/ starch slurry (g/min) | Water at Port 2 (g/min) | Maleic acid (34.2%) (g/min) | Water at Static Mixer (g/min) | NH$_4$Cl at Static Mixer (g/min) |
|---|---|---|---|---|---|
| 241 | 243.3 | 61 | 48 | 1.6 | 24.8 |

Samples are taken at the dump after the static mixer for analysis. The acid content is determined to be 0.35 mmol H/g, the degree of substitution is 0.029, and the yield is 38% via Test Method A described herein. The viscosity is 7.8231 Pa s at a shear rate of 3000 s$^{-1}$ and the n value is 0.54. The water content was 45.29% and using method G, the pH is 9.22.

Example 5

Synthesis of Native Corn Starch Ethersuccinate

Native corn starch (140.00 g, 0.86 mol), calcium hydroxide (10.82 g, 0.146 mol), maleic acid (10.50 g, 0.0905 mol) and water (214 mL) are charged to a jacketed 1 L reactor fitted with a recirculation bath, mechanical stirrer, pH probe, and combination gas inlet/syringe port adapter. The reaction mixture is kept at 50° C. under argon for 19 hours. A 13.48 g aliquot of the reaction mixture is converted to 4.10 g of the acid form. The acid content is determined to be 0.75 mmol H/g, the degree of substitution is 0.063 and the yield is 63% via Test Method A described below. The mmoles of excess calcium hydroxide per gram of starch is (146 mmoles−90.5 mmoles)/140 g=0.4 mmoles/g. The mmoles of maleic acid attached to the starch is (0.63×90.5 mmoles)/140 g=0.41 mmoles/g.

Example 6

Synthesis of Native Corn Starch Ethersuccinate

Native corn starch (140.00 g, 0.86 mol), calcium hydroxide (17.99 g, 0.242 mol), maleic acid (17.29 g, 0.149 mol) and water (400 mL) are charged to a jacketed 1 L reactor fitted with a recirculation bath, mechanical stirrer, pH probe, and combination gas inlet/syringe port adapter. The reaction mixture is kept at 50° C. under argon for 20 hours and then filtered by suction filtration to give 352.78 g of wet cake. A 122.78 g aliquot of the wet cake is suspended in 300 mL of 2:1 v/v MeOH/water containing 30 mL of concentrated hydrochloric acid. The suspension is filtered and the precipitate washed with 700 mL of 2:1 v/v MeOH/water until the filtrate is pH 5. The precipitate is washed with 200 mL of MeOH and dried at 65 C in an oven for 1 hr to give 42.62 g of white product. The acid content is determined to be 1.36 mmol H/g, the degree of substitution is 0.12 and the yield is 69% via Test Method A described below. The mmoles of excess calcium hydroxide per gram of starch is (242 mmoles–149 mmoles)/140 g=0.66 mmoles/g. The mmoles of maleic acid attached to the starch is (0.69×149 mmoles)/140 g=0.73 mmoles/g. The HNMR spectrum shows a broad resonance at 2.8 ppm for the methylene protons of the ethersuccinate group. The degree of substitution can also be determined by dividing by two the integration ratio of the 2.8 ppm resonance to the anomeric glucoside proton resonances at 5.3 and 5.7 ppm. By this method the degree of substitution is 0.14.

Example 7

Synthesis of Peroxide-Thinned Granular Starch Ethersuccinate

Native corn starch (140.00 g, 0.86 mol), 1% aqueous copper sulfate pentahydrate (1.40 mL, 5.61 mmol), and water (400 mL) are charged to a jacketed 1 L reactor fitted with a recirculation bath, mechanical stirrer, pH probe, and combination gas inlet/syringe port adapter. The reaction mixture was adjusted to pH 9.2 with 1 N sodium hydroxide. Then 30% hydrogen peroxide (11.84 g, 0.10 mol) was added dropwise over 30 min using a syringe pump. The reaction mixture is kept at 40 C for 95 min until the peroxide content is <10 ppm as determined by peroxide test strips. Then calcium hydroxide (10.82 g, 0.148 mol) and maleic acid (10.50 g, 0.0905 mol) are charged to the reactor. The reaction mixture is kept at 50° C. under argon for 20 hours. A 10 mL aliquot of the reaction mixture was withdrawn and submitted to Test Method A described herein. The acid content is determined to be 0.80 mmol H/g, the degree of substitution is 0.068 and the yield is 68% via Test Method A described below.

Example 8

Synthesis of Guar Ethersuccinate

Guar (purchased from Sigma) (14.00 g, 0.086 mol) and maleic acid (0.53 g, 4.57 mmol) is placed in a mortar and pestle. Then calcium hydroxide (0.80 g, 10.8 mmol) dispersed in 14 g water is added. The reaction is mixed thoroughly and transferred to a 100 mL bottle with lid. The bottle is capped and placed in an 65° C. oven for 24 hr. The reaction mixture is then converted to the acid form. The acid content is determined to be 0.26 mmol H/g, the degree of substitution is 0.022, and the yield is 41% via Test Method A described herein.

Example 9

Synthesis of Cellulose Ethersuccinate

Eucalyptus pulp (5.00 g, 0.0309 mol) is ground up in a coffee grinder and then maleic acid (0.58 g, 5.00 mmol) is added and mixed with the coffee grinder. The mixture is transferred to a 100 mL bottle with lid and calcium hydroxide (0.86 g, 11.6 mmol) dispersed in 15 g water is added. The bottle is capped and placed in an 65° C. oven for 24 hr. The reaction mixture is then converted to the acid form. The acid content is determined to be 0.44 mmol H/g, the degree of substitution is 0.037, and the yield is 23% via Test Method A described herein.

Example 10

Synthesis of Polyvinylalcohol Ethersuccinate

Polyvinylalcohol (Celvol 107, 98.4% hydrolyzed, Celanese) (28.00 g, 0.64 mol) is placed in a 180 mL stainless steel beaker along with 90 mL water. After stirring with a Jiffy mixer for 1 hr at 80° C., the polyvinylalcohol is dissolved. Then calcium hydroxide (3.20 g, 0.043 mol) suspended in 10 mL water is added, followed by maleic acid (2.10 g, 0.017 mol). The reaction mixture is placed in a hot water bath held at 80° C. for 2.5 hr. Reaction weight is 116.42 g. A 29.41 g portion of the reaction mixture is converted to 1.71 g of the acid form. The acid content is determined to be 0.48 mmol H/g, the degree of substitution is 0.011, and the yield is 41% via Test Method A described herein.

Nonlimiting Example of a Process for Making a Hydroxyl Polymer Structure

Any suitable process known to those skilled in the art can be used to produce the polymer solution and/or to polymer process the polymer solution and/or to produce the polymer structure of the present invention. Nonlimiting examples of such processes are described in published applications: EP 1 035 239, EP 1 132 427, EP 1 217 106, EP 1 217 107, WO 03/066942 and U.S. Pat. No. 5,342,225.

a. Making a Polymer Solution

A polymer solution comprising an ethersuccinylated hydroxyl polymer of the present invention may be prepared using a screw extruder, such as a vented twin screw extruder.

A barrel 10 of an APV Baker (Peterborough, England) twin screw extruder is schematically illustrated in FIG. 1A. The barrel 10 is separated into eight zones, identified as zones 1-8. The barrel 10 encloses the extrusion screw and mixing elements, schematically shown in FIG. 1B, and serves as a containment vessel during the extrusion process. A solid feed port 12 is disposed in zone 1 and a liquid feed port 14 is disposed in zone 1. A vent 16 is included in zone 7 for cooling and decreasing the liquid, such as water, content of the mixture prior to exiting the extruder. An optional vent stuffer, commercially available from APV Baker, can be employed to prevent the polymer solution from exiting through the vent 16. The flow of the polymer solution through the barrel 10 is from zone 1 exiting the barrel 10 at zone 8.

Figure 1B:
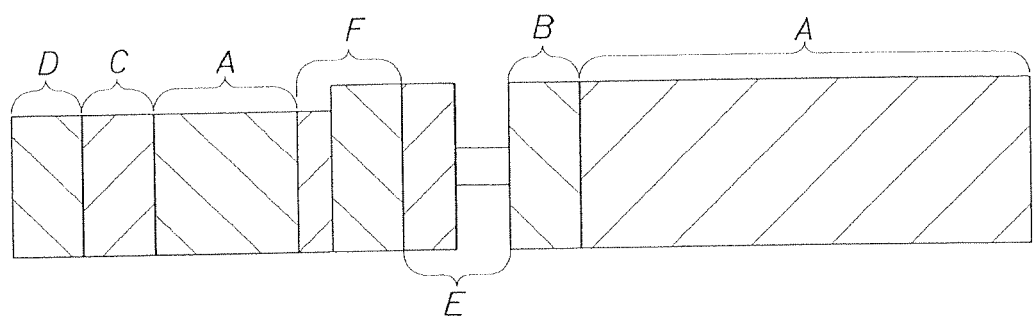
FIG. 1B is a schematic side view of a screw and mixing element configuration suitable for use in the barrel of FIG. 1A.

A screw and mixing element configuration for the twin screw extruder is schematically illustrated in FIG. 1B. The twin screw extruder comprises a plurality of twin lead screws (TLS) (designated A and B) and single lead screws (SLS) (designated C and D) installed in series. Screw elements (A-D) are characterized by the number of continuous leads and the pitch of these leads.

A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and SLS. Screw element A is a TLS with a 1.0 pitch and a 1.5 length ratio. Screw element B is a TLS with a 1.0 pitch and a 1.0 L/D ratio. Screw element C is a SLS with a ¼ pitch and a 1.0 length ratio. Screw element D is a SLS with a ¼ pitch and a ½ length ratio.

Bilobal paddles, E, serving as mixing elements, are also included in series with the SLS and TLS screw elements in order to enhance mixing. Various configurations of bilobal paddles and reversing elements F, single and twin lead screws threaded in the opposite direction, are used in order to control flow and corresponding mixing time.

In zone 1, an ethersuccinylated hydroxyl polymer is fed into the solid feed port at a rate of 183 grams/minute using a K-Tron (Pitman, N.J.) loss-in-weight feeder.

These the ethersuccinylated hydroxyl polymer is combined inside the extruder (zone 1) with the water, an external plasticizer, added at the liquid feed at a rate of 136 grams/minute using a Milton Roy (Ivyland, Pa.) diaphragm pump (1.9 gallon per hour pump head) to form a polymer solution. The polymer solution is then conveyed down the barrel of the extruder and cooked, in the presence of an alkaline agent, such as ammonium hydroxide and/or sodium hydroxide. (introduction of external plasticizer such as glycerin) The cooking causes a hydrogen from at least one hydroxyl moiety on one or more of the hydroxyl polymers to become disassociated from the oxygen atom of the hydroxyl moiety and thus creates a negative charge on the oxygen atom of the former hydroxyl moiety. This oxygen atom is now open for substitution by a substitution agent, such as a cationic agent, such as a quaternary ammonium compound, for example a quaternary amine.

Table 1 describes the temperature, pressure, and corresponding function of each zone of the extruder.

TABLE 1

| Zone | Temp. (° F.) | Pressure | Description of Screw | Purpose |
| --- | --- | --- | --- | --- |
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 300 | Medium | Pressure Generating | Cooking at Pressure and Temperature |
| 6 | 250 | High | Reversing | Cooking at Pressure and Temperature |
| 7 | 210 | Low | Conveying | Cooling and Conveying (with venting) |
| 8 | 210 | Low | Pressure Generating | Conveying |

After the third hydroxyl polymer solution exits the extruder, part of the polymer solution can be dumped and another part (100 g) can be fed into a Zenith®, type PEP II (Sanford N.C.) and pumped into a SMX style static mixer (Koch-Glitsch, Woodridge, Ill.). The static mixer is used to combine additional additives such as crosslinking agents, crosslinking facilitators, external plasticizers, such as water, with the third hydroxyl polymer solution. The additives are pumped into the static mixer via PREP 100 HPLC pumps (Chrom Tech, Apple Valley Minn.). These pumps provide high pressure, low volume addition capability. The third hydroxyl polymer solution of the present invention exhibits a Capillary Number of at least 1 and thus, is ready to be polymer processed into a polymer structure.

b. Polymer Processing the Polymer Solution into a Polymer Structure

The polymer processable hydroxyl polymer solution is then polymer processed into a hydroxyl polymer structure, such as a fiber. Nonlimiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, continuous fiber producing and/or tow fiber producing. Fiber spinning may be dry spinning or wet spinning. Polymer structures produced as a result of polymer processing of a polymer solution in accordance with the present invention may be combined, such as when the polymer structures are in the form of fibers, into a fibrous structure by collecting a plurality of the fibers onto a belt or fabric.

A polymer structure and/or fibrous structure of the present invention may then be post-processed by subjecting the web to a post-processing operation. Nonlimiting examples of post processing operations include curing, embossing, thermal bonding, humidifying, perfing, calendering, printing, differential densifying, tuft deformation generation, and other known post-processing operations.

c. Post-Processing the Fibrous Structure

In one example, a fibrous structure formed by processing the polymer solution according to the present invention into a plurality of fibers is subjected to a post-processing operation.

The fibrous structure of the present invention may be cured during a curing operation by subjecting the fibrous structure to a temperature of from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. In one example, the curing operation comprises passing the fibrous structure over curing plates set at about 135° C. to about 155° C. Alternative curing operations include radiation methods such as UV, e-beam, IR and other temperature-raising methods.

Other Applications of Ethersuccinylated Hydroxyl Polymers

The ethersuccinylated hydroxyl polymers of the present invention may exhibit properties related to viscosity modification, solubility, film formation, polymer compatibilization, melt/solution processability, solid suspension, emulsion stabilization, cation binding, crystal growth inhibition, adhesiveness and swelling of crosslinked ethersuccinylated hydroxyl polymers and/or as supersorbers.

Applications involving viscosity modification include thickeners to be used in foods, pharmaceuticals, latex paints, personal care products, and petroleum fracturing. For thickener applications, the ethersuccinylated starch hydroxyl polymer may have a DS of 0.05-0.7 and have a MW>500,000. Granular ethersuccinylated starch hydroxyl polymer in the calcium form (obtained directly from the reaction) may be particularly advantageous in that it retains its granular nature until the calcium is removed either by a sequestrant or acid and then it rapidly swells.

The swelling properties of ethersuccinylated starch hydroxyl polymer allow its use as a disintegrant in tablets. For disintegrant applications, the ethersuccinylated starch hydroxyl polymer may have a DS of 0.05-0.5, and may be prepared from unmodified potato starch, M in Structure I above may be a mixture of H and Na, and the ethersuccinylated starch hydroxyl polymer may be crosslinked.

For absorbent properties, the ethersuccinylated native corn starch hydroxyl polymer may have a DS of 0.12 and be crosslinked with crosslinker at a molar ratio of crosslinker to glucoside units of 0.007. It may be advantageous to use ethersuccinylated native corn starch hydroxyl polymer with a DS of 0.12 in combination with guar.

As a textile sizing agent, an ethersuccinylated waxy corn starch hydroxyl polymer may be advantageous especially if applied with imidazole. The imidazole can catalyze esterification of cellulose with ethersuccinylated starch during ironing and thus provide an anti-wrinkle benefit.

Ethersuccinylated starch hydroxyl polymer may also function in papermaking as a wet and dry strength resin.

Applications involving its adhesiveness include adhesives, ceramics, dry wall joint compounds, and binders for various products.

Emulsification properties of ethersuccinylated polyvinylalcohol could be used in emulsion polymerizations, emulsification in foods, pharmaceuticals and personal care products.

Applications of film forming properties include coatings, textile warp sizing and paper processing. The granular ethersuccinylated starch hydroxyl polymer with calcium carbonate may be particularly useful in modifying paper properties such as opacity.

Applications involving solid suspension and crystal growth inhibition properties may be particularly suitable for detergent and ore processing applications. For these applications the DS may range from about 0.1 to about 0.7 and the MW from about 10,000 to about 100,000.

Applications of the ethersuccinylated hydroxyl polymers of the present invention include supersorbers for use in such products as diapers and/or training pants and/or feminine hygiene products and/or adult incontinence products.

Test Methods of the Present Invention

A. Determination of Acid Content, Degree of Ethersuccinate Substitution, and % Yield A 10 g weighed sample of ethersuccinylated hydroxyl polymer was first converted to the acid form and unreacted maleic acid removed. Insoluble materials, for example low DS ethersuccinylated granular starch and cellulose, were suspended in 50 mL DI water containing 10 mL of concentrated hydrochloric acid. The starch or cellulose was collected by suction filtration and washed with water (4×100 mL) until the filtrate was about pH 5. The starch or cellulose was washed with methanol (1×50 mL) and dried at room temperature to a constant weight. Granular materials which gel in water, for example ethersuccinylated guar, were converted similarly except that 1:1 v/v MeOH/water was used in place of water. Materials which are already gelled, for example ethersuccinylated destructured starch and polyvinylalcohol, were dissolved in 50 mL water with 10 mL concentrated hydrochloric acid added. Then methanol (100 mL) was added and the ethersuccinylated material precipitated with a wood pulp consistency. The precipitate was squeezed with a spatula to remove the supernatant. The precipitate was dissolved in 50 mL water, methanol (200 mL) added to precipitate the ethersuccinylated material, and the precipitate squeezed with a spatula to remove the supernatant. This procedure was repeated until the supernatant had a pH~5 and then the supernatant was allowed to dry at room temperature to a constant weight.

A 0.4-2 g weighed sample (depending on the DS of the ethersuccinylated polymer) of ethersuccinylated hydroxyl polymer in the acid form was placed in 50 mL 2.5% sodium chloride solution and heated to boiling to effect dissolution. Then 0.1 N sodium hydroxide (20.0 mL) was added to the solution or suspension which usually immediately became clear. A drop of 0.5 wt % phenolphthalein solution was added and titration with 0.1 N hydrochloric acid was performed.

$$\text{Acid content} = \frac{(20\text{-mL } 0.1 \text{ HCl}) \times 0.1 \text{ mmol/mL}}{\text{Wt. (g) sample titrated}} = \text{mmol H/g sample}$$

$$\text{Degree of Substitution (for polyglucosides)} = \frac{0.081 \times (\text{Acid content})}{1 - [(0.058) \times (\text{Acid content})]}$$

$$\text{Theoretical Degree of Substitution} = \frac{\text{mols maleic acid in reaction}}{\text{mols of hydroxyl monomer units in reaction}}$$

% Yield = Actual Degree of Substitution/Theoretical Degree of Substitution

B. Fiber Diameter Test Method

A polymeric structure comprising fibers of appropriate basis weight (approximately 5 to 20 grams/square meter) is cut into a rectangular shape, approximately 20 mm by 35 mm. The sample is then coated using a SEM sputter coater (EMS Inc, PA, USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.3) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments and/or individual features of the present invention have been illustrated and described, it would be obvious to those skilled in the art that various other changes and modifications can be made without departing from the spirit and scope of the invention. Further, it should be apparent that all combinations of such embodiments and features are possible and can result in preferred executions of the invention. Therefore, the appended claims are intended to cover all such changes and modifications that are within the scope of this invention.

All documents cited in the Detailed Description of the Invention are, in relevant part, incorporated herein by reference; the citation of any document is not to be construed as an admission that it is prior art with respect to the present invention.

What is claimed is:

1. A process for making a hydroxyl polymer wherein the process comprises the steps of:
   a. reacting a precursor hydroxyl polymer selected from the group consisting of: polyvinyl alcohol, polyvinyl alcohol derivatives, polyvinyl alcohol copolymers, starch, starch derivatives, chitosan, chitosan derivatives, cellulose, cellulose derivatives, gums, arabinans, galactans, proteins and mixtures thereof with an α, β-unsaturated dicarboxylic acid or salts thereof to produce a hydroxyl polymer comprising an ethersuccinate moiety having the formula:

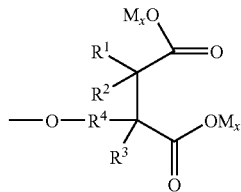

wherein $R^1$, $R^2$ and $R^3$ are independently selected from H, branched or linear $C_1$-$C_4$ alkyl and mixtures thereof; $R^4$ is $(CH_2)_y$; M is independently selected from H, cations and mixtures thereof; x is greater than 0 but less than or equal to 1; y is 0 or 1, wherein the ethersuccinate moiety is covalently bonded to a carbon atom in the hydroxyl polymer; and
   b. recycling the α, β-unsaturated dicarboxylic acid or salts thereof.

2. The process according to claim 1 wherein the α, β-unsaturated dicarboxylic acid or salts thereof comprises an alkene dicarboxylic acid or salt thereof.

3. The process according to claim 2 wherein the alkene dicarboxylic acid is selected from the group consisting of: maleic acid, itaconic acid, citraconic acid and mixtures thereof.

4. The process according to claim 1 wherein the step of reacting occurs in the presence of an alkaline earth metal salt.

5. The process according to claim 4 wherein the alkaline earth metal salt comprises $Ca(OH)_2$.

6. The process according to claim 4 wherein the ratio of the mmoles of excess alkaline earth metal salt per gram of precursor hydroxyl polymer is 0.3 mmol/g or greater.

7. The process according to claim 6 wherein the ratio is from about 0.3 to about 0.7 mmol/g.

* * * * *